United States Patent
Okino

(10) Patent No.: US 12,223,302 B2
(45) Date of Patent: Feb. 11, 2025

(54) SYSTEM AND METHOD FOR SELECTION OF VEHICLE APPLICATION INSTALLATION ORDER

(71) Applicant: WOVEN BY TOYOTA, INC., Tokyo (JP)

(72) Inventor: Naoto Okino, Tokyo (JP)

(73) Assignee: WOVEN BY TOYOTA, INC., Tokyo (JP)

(*) Notice: Subject to any disclaimer, the term of this patent is extended or adjusted under 35 U.S.C. 154(b) by 55 days.

(21) Appl. No.: 18/159,783

(22) Filed: Jan. 26, 2023

(65) Prior Publication Data

US 2024/0256246 A1   Aug. 1, 2024

(51) Int. Cl.
*G06F 8/65* (2018.01)
*G06F 8/61* (2018.01)
*G06F 9/44* (2018.01)
*G06F 9/445* (2018.01)
*G06F 9/48* (2006.01)

(52) U.S. Cl.
CPC .............. *G06F 8/61* (2013.01); *G06F 8/65* (2013.01); *G06F 8/66* (2013.01); *G06F 9/4881* (2013.01)

(58) Field of Classification Search
CPC ..... G06F 8/61; G06F 8/65; G06F 8/66; G06F 8/68; G06F 8/665; G06F 9/4881
See application file for complete search history.

(56) References Cited

U.S. PATENT DOCUMENTS

| | | | |
|---|---|---|---|
| 9,063,818 B1 | 6/2015 | Risbood et al. | |
| 9,824,094 B1* | 11/2017 | Meyer | H04L 67/1097 |
| 10,042,629 B2 | 8/2018 | Sarkar et al. | |
| 10,582,402 B2* | 3/2020 | Oldewurtel | H04W 4/029 |
| 2003/0220992 A1* | 11/2003 | DiRico | G06F 9/453 709/221 |
| 2008/0028389 A1* | 1/2008 | Genty | G06F 8/61 717/174 |
| 2011/0202913 A1 | 8/2011 | Nishimura | |
| 2014/0149974 A1* | 5/2014 | Bank | G06F 8/65 717/172 |
| 2019/0258467 A1* | 8/2019 | Frantz | G01C 21/3691 |
| 2020/0218531 A1* | 7/2020 | Kushwaha | G06F 8/66 |

(Continued)

FOREIGN PATENT DOCUMENTS

JP   2021-177383 A   11/2021

OTHER PUBLICATIONS

Roland Herberth et al., Automated Scheduling for Optimal Parallelization to Reduce the Duration of Vehicle Software Updates, Mar. 2019, [Retrieved on Aug. 16, 2024]. Retrieved from the internet: <URL: https://ieeexplore.ieee.org/stamp/stamp.jsp?tp=& arnumber=8626041> 13 Pages (2921-2933) (Year: 2019).*

*Primary Examiner* — Anibal Rivera

(74) *Attorney, Agent, or Firm* — Sughrue Mion, PLLC

(57) ABSTRACT

Provided are method, system, and device for managing installation order of vehicle applications. According to embodiments, a method for specifying an installation order for application packages in a vehicle is provided, the method including: downloading, by at least one processor of the vehicle, a plurality of application packages; obtaining, by the at least one processor, a user-designated installation order for the plurality of application packages; and installing the plurality of application packages in accordance with the obtained user-designated installation order.

17 Claims, 9 Drawing Sheets

(56) References Cited

U.S. PATENT DOCUMENTS

2021/0349708 A1   11/2021  Breitkreutz et al.
2023/0376297 A1*  11/2023  Ji ............................. G06F 8/65
2024/0061672 A1*   2/2024  Uehara ................... G06F 8/65

* cited by examiner

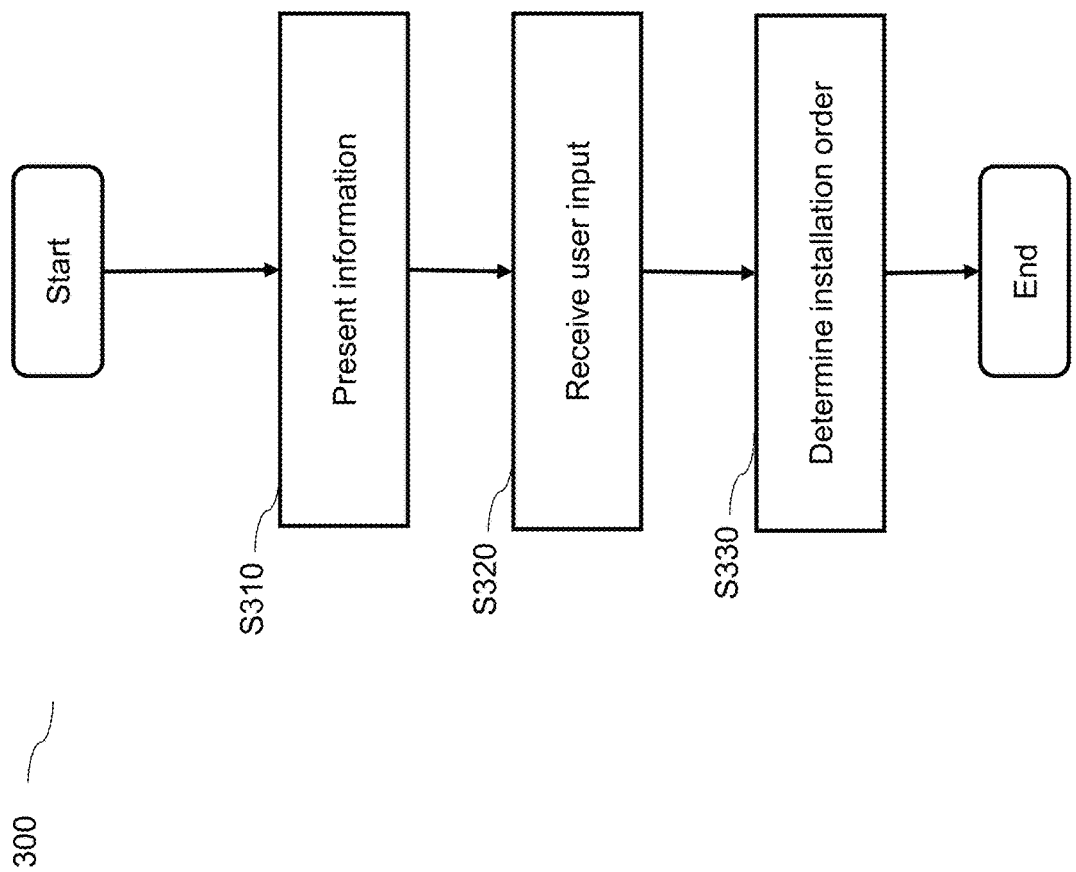

| ID | User Type | App. Name | App. Type | Installation order | Score |
|---|---|---|---|---|---|
| 0001 | Vehicle Owner | App. 1 | New. App | 1 | 90 |
| | | App. 2 | Version Update | 2 | 70 |
| 0002 | Guest Passenger | App. 4 | New. App | 1 | 80 |
| 000# | Deliverer | App. 5 | System Hotfix | # | 100 |

FIG. 6

SYSTEM AND METHOD FOR SELECTION OF VEHICLE APPLICATION INSTALLATION ORDER

TECHNICAL FIELD

Methods, systems, and apparatuses consistent with example embodiments of the present disclosure relate to installation of applications in vehicles, and more particularly, to selecting an installation order for one or more applications in vehicles.

BACKGROUND

Vehicle infotainment and control systems in the related art execute one or more applications installed therein. These applications are installed or updated via wireless transmissions from one or more web storages. Related art in-vehicle infotainment (IVI) systems allow a user to select one or more applications that a user would like to install via a user's terminal (e.g., smartphone, etc.) and/or via an input device attached to the vehicle (e.g., a display device, etc.).

Nevertheless, related art IVI systems do not allow a user to select an order in which to download and to install applications selected for installation in the vehicle. As a result, if a user desires to use a particular application immediately, the user has to wait for prior applications to install first.

Similarly, related art IVI systems do not install applications according to criticality or priority of application. For instance, an application related to a vehicle defect which needs to be installed as soon as possible may be delivered to the IVI systems without knowledge of the user, but related art IVI systems are not able to differentiate and prioritize said critical application over other non-critical application (e.g., prior application(s) selected by the user, etc.). Accordingly, said critical application may need to wait for prior applications to install first, thereby delaying installation of the more important application.

SUMMARY

Example embodiments of the present disclosure provide a system and method for managing the installation of application packages. According to embodiments, methods and systems for enabling a user to an order for downloading and/or for installing one or more application packages are provided. Further, the methods and systems may automatically determine a priority of one or more application packages. Accordingly, the methods and systems may automatically download and/or install the one or more application packages based on the user-designated order and/or based on the order defined by the priority.

According to embodiments, a method for specifying an installation order for application packages in a vehicle is provided, the method including: downloading, by at least one processor of the vehicle, a plurality of application packages; obtaining, by the at least one processor, a user-designated installation order for the plurality of application packages; and installing the plurality of application packages in accordance with the obtained user-designated installation order. The installing may include: determining an application package among the plurality of application packages as a priority application package; and installing the determined priority application package first, irrespective of the user-designated installation order. The determining may include determining a safety-critical application package or an application package related to a vehicle defect as the priority application package.

The downloading may include downloading the plurality of packages in accordance with the user-designated installation order.

The method may further include: for one or more applications in which an installation order is not designated by a user, determining an installation order based on at least one of a user's behavior history or related users' behavior histories. The determining the installation order may include determining the installation order using a machine learning model.

The obtaining of the user-designated installation order for the plurality of application packages may include: presenting information associated with the plurality of application packages to the user; receiving user input associated with the plurality of application packages; and determining, based on the user input, the user-designated installation order for the plurality of application packages.

According to embodiments, a system for specifying an installation order for application packages in a vehicle is provided, the system including: at least one memory storage storing computer-executable instructions; and at least one processor communicatively coupled to the at least one memory storage, wherein the at least one processor may be configured to execute the computer-executable instructions to: download a plurality of application packages; obtain a user-designated installation order for the plurality of application packages; and install the plurality of application packages in accordance with the obtained user-designated installation order.

The at least one processor may be configured to execute the computer-executable instructions to install the plurality of application packages by: determining an application package among the plurality of application packages as a priority application package; and installing the determined priority application package first, irrespective of the user-designated installation order. The at least one processor may be configured to execute the computer-executable instructions to determine the application package as the priority application package by: determining a safety-critical application package or an application package related to a vehicle defect as the priority application package.

The at least one processor may be configured to execute the computer-executable instructions to download the plurality of application packages by downloading the plurality of packages in accordance with the user-designated installation order.

The at least one processor may be further configured to execute the computer-executable instructions to: for one or more applications in which an installation order is not designated by a user, determine an installation order based on at least one of a user's behavior history or related users' behavior histories. The at least one processor may be further configured to execute the computer-executable instructions to determine the installation order by determining the installation order using a machine learning model.

The at least one processor may be further configured to execute the computer-executable instructions to obtain the user-designated installation order by: presenting information associated with the plurality of application packages to the user; receiving user input associated with the plurality of application packages; and determining, based on the user input, the user-designated installation order for the plurality of application packages.

According to embodiments, a non-transitory computer-readable recording medium is provided. The non-transitory computer-readable recording medium may have recorded thereon instructions executable by at least one processor to cause the at least one processor to perform a method for specifying an installation order for application packages in a vehicle, the method including: downloading, by at least one processor of the vehicle, a plurality of application packages; obtaining, by the at least one processor, a user-designated installation order for the plurality of application packages; and installing the plurality of application packages in accordance with the obtained user-designated installation order.

The installing may include: determining an application package among the plurality of application packages as a priority application package; and installing the determined priority application package first, irrespective of the user-designated installation order. The determining may include determining a safety-critical application package or an application package related to a vehicle defect as the priority application package.

The downloading may include downloading the plurality of packages in accordance with the user-designated installation order.

The method may further include: for one or more applications in which an installation order is not designated by a user, determining an installation order based on at least one of a user's behavior history or related users' behavior histories. The determining the installation order may include determining the installation order using a machine learning model.

The obtaining of the user-designated installation order for the plurality of application packages may include: presenting information associated with the plurality of application packages to the user; receiving user input associated with the plurality of application packages; and determining, based on the user input, the user-designated installation order for the plurality of application packages.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like reference numerals denote like elements, and wherein:

FIG. 3 illustrates a block diagram of a method for specifying an installation order for application packages in a vehicle, according to one or more embodiments;

FIG. 6 illustrates a table containing examples application packages and the associated information, according to one or more embodiments;

DETAILED DESCRIPTION

Figure 1:
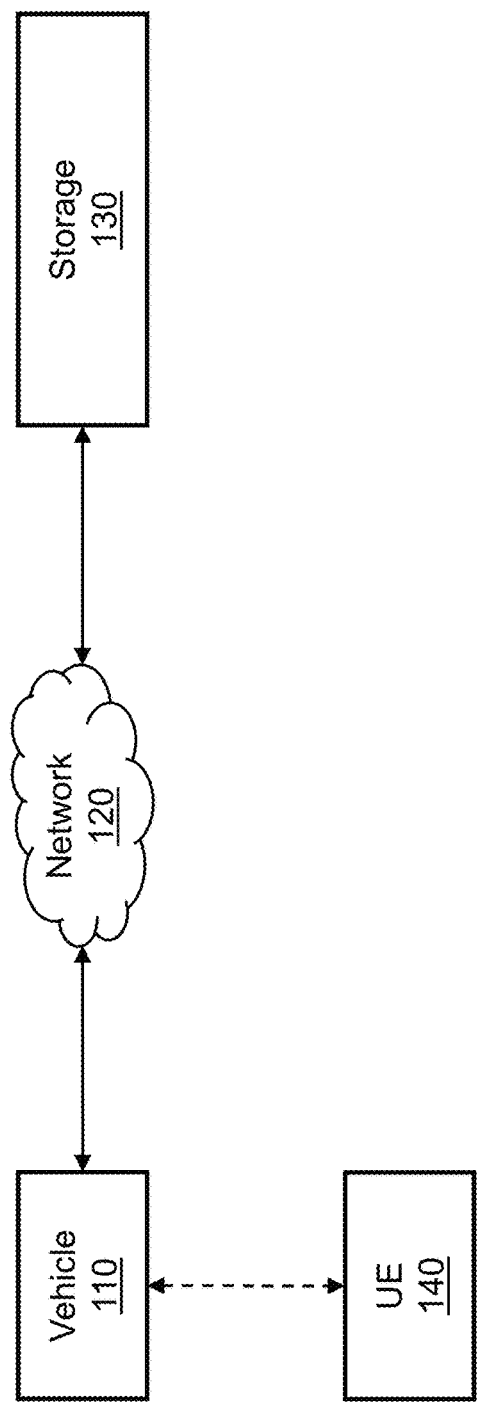
FIG. 1 illustrates a block diagram of an example system for downloading and installing vehicle application packages, according to one or more embodiments.

The following detailed description of exemplary embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In one implementation of the disclosure described herein, a display page may include information residing in the computing device's memory, which may be transmitted from the computing device over a network to a database center and vice versa. The information may be stored in memory at each of the computing device, a data storage resided at the edge of the network, or on the servers at the database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Phrases and terms similar to "application packages", "software", "application", "app", and "firmware" may include any suitable type of software application or data packages which may be installed in one or more systems of a vehicle. Example embodiments are described herein in the context of installation of one or more application packages in vehicle infotainment systems, although it can be understood that the descriptions associated therewith are merely illustrative and are not intended to be in any way limiting the scope of the present disclosures.

Modern day vehicles typically include in-vehicle infotainment (IVI) systems to provide a combination of entertainment and information to the user (e.g., driver, passenger, etc.) to enhance user's in-vehicle experience. The IVI systems may execute one or more installed application packages to provide an associated service. For instance, the IVI system may execute an audio streaming application to provide audio entertainment, may execute a video player application to provide video entertainment, may execute a web browser application to provide web surfing, may execute a global positioning system (GPS) application to provide road navigation, and the like.

Example embodiments of the present disclosure provide a system and method for enabling a user (e.g., a vehicle driver, a passenger, an application deliverer, etc.) to manage the installation of vehicle application packages. Specifically, a system and method of example embodiments enable the user to specify an order for downloading application packages and to specify an order for installing the application packages. Accordingly, the system and method may automatically download and/or install the application packages according to the user-designated order.

In addition, according to an embodiment, the system and method may automatically determine a priority of one or more application packages based on a type of application package, a type of associated user, or a combination thereof. Accordingly, the system and method may automatically download and/or install the one or more application packages based on an order defined by the determined priority and the user-designated order.

Further, according to an embodiment, the system and method may utilize a machine learning (ML) model to predict an order of downloading and installation for application packages. Specifically, the system and method may utilize one or more ML models to automatically determine an order of downloading and installation for one or more application packages, and may automatically execute the downloading and installation based on the determined order or may recommend the determined order to the user.

Ultimately, example embodiments of the present disclosure allow a user to specify and prioritize downloading and/or installation of one or more application packages, such that the user may timely utilize the desired application(s) without waiting for other prior applications to be downloaded and installed. In addition, downloading and/or installation of application packages with high criticality or urgency may be prioritized ahead of other application packages, thus the vehicle safety may be improved as these application packages will be installed before other application packages. Further, by implementing one or more ML models to automatically determine an order for downloading and/or installing application packages, a user's burden may be reduced and user experiences (particularly, for an inexperienced user who is not familiar with the configuration of the order and/or who does not have insight of which application package(s) should be prioritized) may be improved.

FIG. 1 illustrates a block diagram of an example system 100 for downloading and installing application packages, according to one or more embodiments. Referring to FIG. 1, system 100 may include a vehicle 110, a network 120, a storage 130, and an optional user equipment (UE) 140.

Vehicle 110 may be any motorized and/or mechanical machine which may carry or transport people and/or cargo, such as: a car, a truck, a motorcycle, a bus, a bicycle, a mobility scooter, and the like. Further, vehicle 110 may include an infotainment system configurable to execute processes (e.g., downloading, installation, running, etc.) associated with one or more application packages. The processes associated with the one or more application packages may be initiated by a vehicle user (e.g., a driver, a passenger, etc.) via the UE 140 and/or via an input component of the vehicle (e.g., a display, etc.), and/or may be initiated by a deliverer (e.g., a vehicle manufacturer, an application developer, etc.) via any suitable equipment communicatively coupled to vehicle 110 (e.g., via the network 120, etc.). The one or more application packages may be obtained (e.g., downloaded, received, etc.) by the vehicle 110 from the storage 130 via the network 120.

Network 120 may include one or more data links that enable the transport of electronic data between vehicle 110 and storage 130 (and the components or systems included therein). According to embodiments, network 120 may include one or more wired and/or wireless networks. For example, network 120 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

Storage 130 may include one or more web storages or servers configured to store data associated with one or more application packages (e.g., installation package, media content, source codes, etc.). For instance, storage 130 may receive said data from a vehicle manufacturer and/or an application developer and may store the received data therein. Further, storage 130 may receive (e.g., from the vehicle 110 via network 120) a request for one or more stored data and may provide the requested data accordingly. Further, according to an embodiment, storage 130 may include any non-transitory computer readable medium storing thereon computer readable instructions or program associated with the one or more application packages, such that said computer readable instructions or program when executed by a computer (or a processor), causes the computer to perform a method, function, or control operation associated with the one or more application packages. Further, storage 130 may be implemented in any suitable hardware and/or software in any suitable location, such as a server in a server cluster, a server in a datacenter (e.g., edge datacenter, far edge datacenter, central datacenter, etc.), and the like.

UE 140 may include one or more devices capable of receiving, generating, storing, processing, and/or providing information among system 100. For instance, UE 140 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), a personal digital assistants (PDAs), a roaming device (e.g., a network-connected roaming device), a wireless device (e.g., a wireless email device or other device capable of communicating wireless with a computer network), or any other suitable device. Any discussion of any UE mentioned herein may also apply to other devices, such as devices including short-range ultra-high frequency (UHF) device, near-field communication (NFC) module, infrared (IR) module, controller area network (CAN) module, universal serial bus (USB) module, high definition multimedia interface (HDMI) module, a Bluetooth™ module, and Wi-Fi module, among others.

To this end, the vehicle 110 (or the infotainment system included therein) may communicatively couple to network 120 and send (via network 120) a request for downloading and/or installing one or more application packages to the storage 130. The request may be a user request received by the vehicle 110 from UE 140, and/or may be a request automatically generated by the vehicle 110 (or the infotainment system included therein) upon detecting that installation of one or more application packages is required.

Upon receiving the request, storage 130 may retrieve the required data and send the same to vehicle 110 via network 120. Accordingly, vehicle 110 may install the one or more application packages based on the received data. As further discussed below, according to an embodiment, the storage 130 may provide the requested data according to a determined order. Similarly, vehicle 110 may install the one or more application packages according to a determined order.

Figure 2:
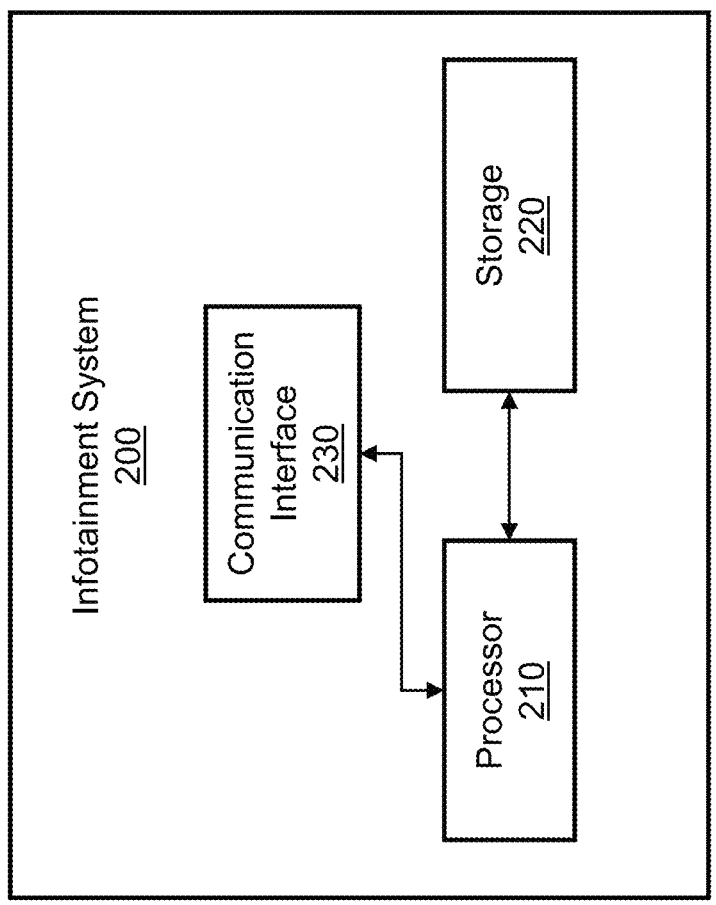
FIG. 2 illustrates a block diagram of an example infotainment system, according to one or more embodiments.

FIG. 2 illustrates a block diagram of an example infotainment system 200, according to one or more embodiments. Infotainment system 200 may be included in a vehicle (e.g., vehicle 110 in FIG. 1) and may be configured to execute one or more applications installed therein to provide one or more infotainment services.

Referring to FIG. 2, infotainment system 200 may include at least one processor 210, at least one storage 220, and at least one communication interface 230, although it can be understood that infotainment system 200 may include any additional hardware and software components without departing from the scope of the present disclosure.

The storage 220 may include any computer-readable medium (e.g., hard disk, memory card storage, etc.) having one or more application packages installed and stored therein. For instance, storage 220 may store computer-readable instructions or programming source code associated with one or more application packages and may provide the same to the processor 210 when required. Further, it can be understood that the storage 220 may have any other suitable data or information stored therein, such as an operating system (OS), user information, and the like.

The processor 210 may include any computing unit or controller (e.g., central processing unit (CPU), graphic processing unit (GPU), microprocessor, carputer, etc.) that may be configured to perform one or more operations. For instance, the processor 210 may obtain computer-readable instructions associated with one or more application packages from the storage 220 and execute the obtained computer-readable instructions to perform one or more operations of the associated service. According to an embodiment, the processor 210 may generate one or more graphical user interfaces (GUIs) to enable a user to specify the order for downloading and/or for installing one or more application packages therefrom.

The communication interface 230 may include one or more communication devices to enable communications between the processor 210 and other devices. For instance, the communication interface 230 may receive data defining one or more GUIs from the processor 210 and provide said data to one or more display devices (e.g., a display screen, etc.) deployed in a vehicle (e.g., vehicle 110 in FIG. 1) such that said one or more display devices may generate and present the one or more GUIs thereon based on the received data. Further, the communication interface 230 may communicatively couple to one or more user equipment (UE) (e.g., UE 140 in FIG. 1) and provide the data defining one or more GUIs to the one or more UE, such that said one or more UE may generate and present the one or more GUIs thereon based on the received data. Furthermore, the communication interface 230 may communicatively couple to one or more networks (e.g., network 120 in FIG. 1) to send and obtain data therefrom (e.g., from storage 130).

FIG. 3 illustrates a block diagram of a method 300 for specifying an installation order for application packages in a vehicle, according to one or more embodiments. Method 300 may be performed by an infotainment system (e.g., infotainment system 200 in FIG. 2) in a vehicle (e.g., vehicle 110 in FIG. 1) to allow a user to designate or to specify (e.g., via UE 140, via display device installed in the vehicle, etc.) the order for installing one or more application packages obtained from a storage (e.g., storage 130). According to embodiments, one or more operations of method 300 may be performed by at least one processor (e.g., processor 210 in FIG. 2) of the infotainment system.

Referring to FIG. 3, at operation S310, information associated with one or more application packages are presented to a user. Specifically, the infotainment system (or one or more components included therein) may be configured to obtain information of available application packages (e.g., new application, application update, firmware update, etc.) from the storage via the network, and may be configured to generate a graphical user interface (GUI) based on the obtained information. Subsequently, the data or information defining the GUI may be provided to a display device (e.g., display device on UE 140, display device installed in the vehicle, etc.) and the display device may generate and display the GUI to the user based on the data or information. As further discussed below, the GUI may include one or more interactive elements (e.g., button, drop-down list, etc.) which may be interacted by the user for configuring the installation order of one or more application packages.

Referring still to FIG. 3, at operation S320, a user input is received. Specifically, the infotainment system (or one or more components included therein) may be configured to receive a user selection or user-designated configuration on the application packages. According to an embodiment, the infotainment system may be configured to receive a user interaction with one or more interactive element included in the displayed GUI.

At operation S330, an installation order is determined. Specifically, the infotainment system (or one or more components included therein) may be configured to determine the installation order designated by the user based on the user input.

According to an embodiment, the installation order is included or updated in a record file (or in any other suitable storage form) stored in a storage (e.g., storage 220) of the infotainment system. The record file may include the historical installation order designated by the user and the information of the associated application packages. In this way, the record file may be utilized by the infotainment system such that one or more associated application packages may be installed based on the user-designated installation order. In addition, the record file may also be utilized by the infotainment system to automatically predict and/or generate a recommendation of installation order.

Figure 4A:
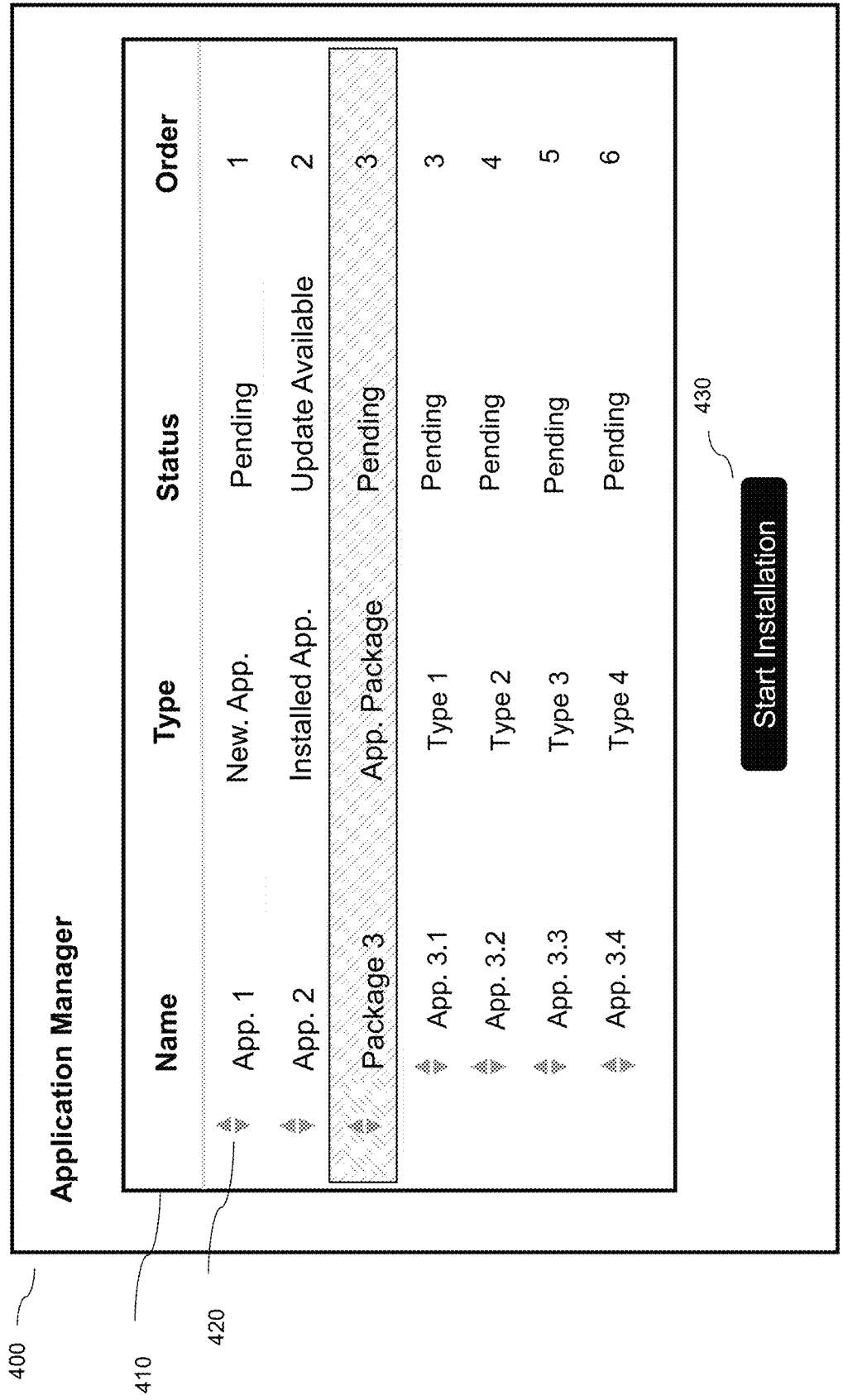
FIG. 4A illustrates an example generalized graphical user interface (GUI), according to one or more embodiments.
Figure 4B:
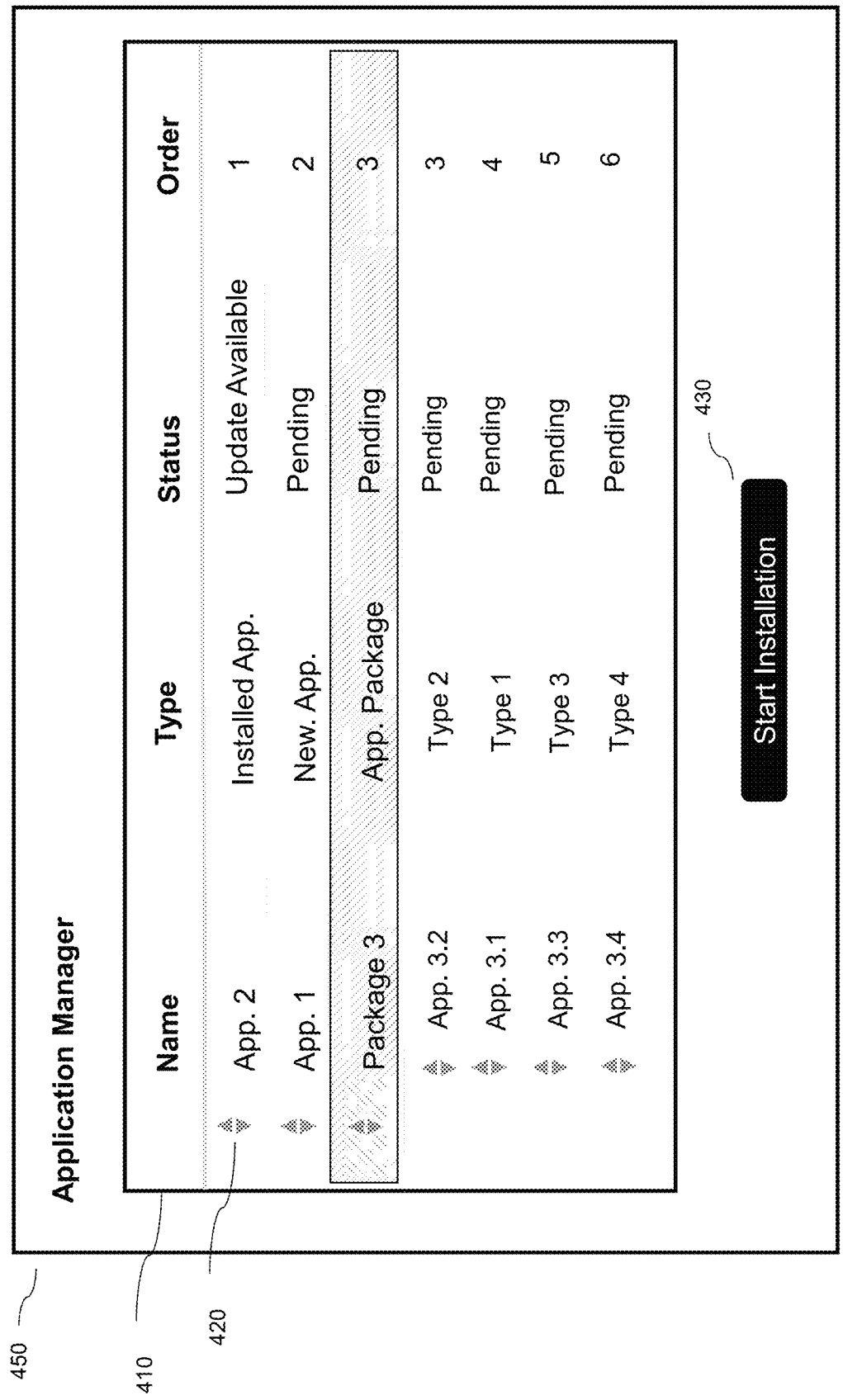
FIG. 4B illustrates another example generalized GUI, according to one or more embodiments.
Figure 5:
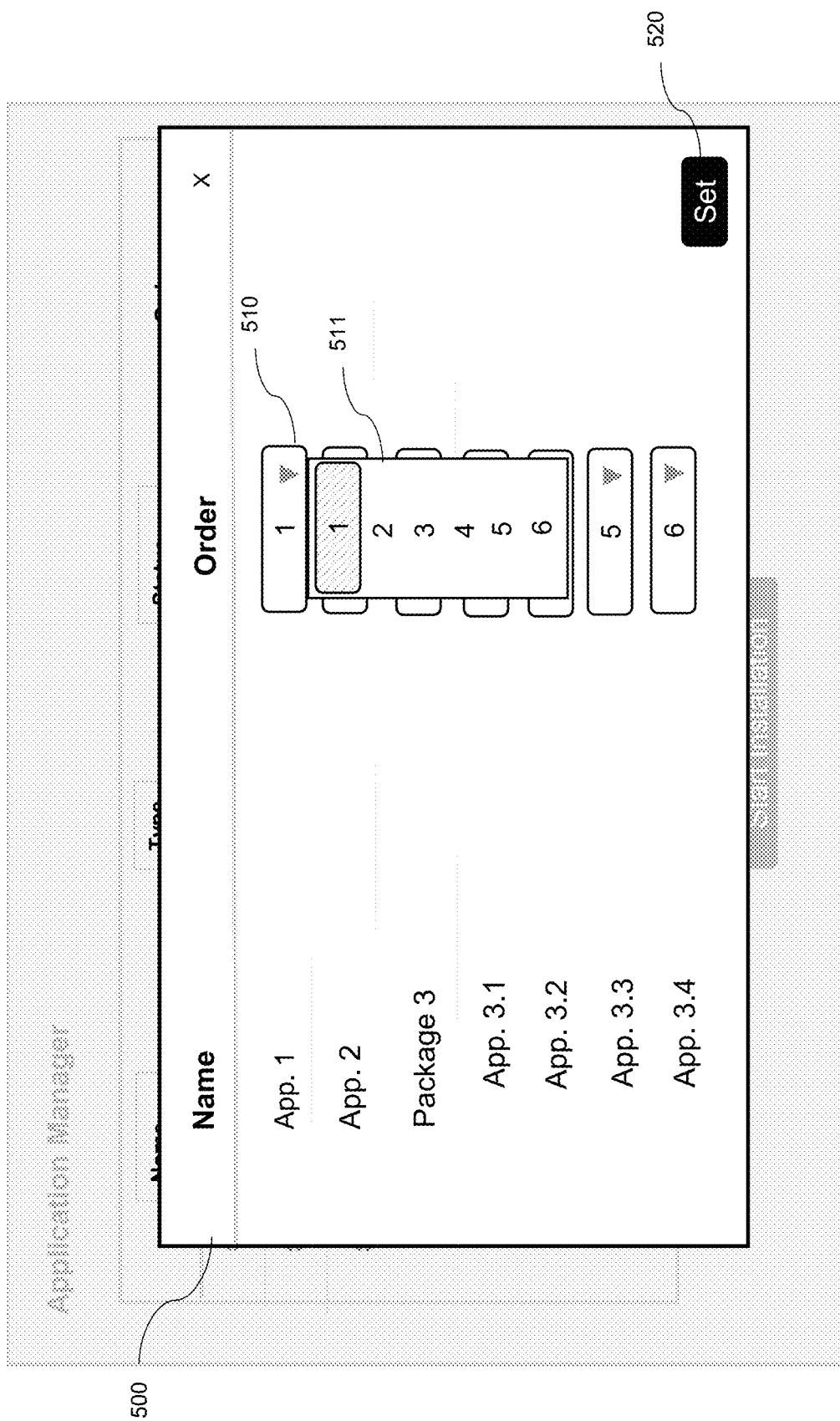
FIG. 5 illustrates an example GUI including a sub-window, according to one or more embodiments.

In the following, an example embodiment associated with the user interaction with one or more GUIs are described with reference to FIG. 4A, FIG. 4B and FIG. 5. It is contemplated that the GUIs illustrated in said FIG. 4A, FIG. 4B, and FIG. 5 are simplified examples provided merely for descriptive purpose, and the embodiments of the present disclosure should not be limited thereto. For instance, said GUIs may include more or less components, may display the information in a different arrangement, or the like, without departing from the scope of the present disclosure.

FIG. 4A illustrates an example of a generalized graphical user interface (GUI) 400, according to one or more embodiments. GUI 400 may be generated by infotainment system (e.g., infotainment system 200 in FIG. 2 or one or more components included therein) and presented to a user for specifying an installation order of application packages. Referring to FIG. 4A, GUI 400 may include a sub-window 410 and an interactive elements 430.

The sub-window 410 may include information associated with one or more application packages, such as the name of application package, type of application package, status of application packages, and current order of the application packages. Further, the sub-window 410 may include a plurality of interactive elements 420. Furthermore, the sub-window 410 may present further detail information of one or more application packages, when applicable.

In the example GUI illustrated in FIG. 4A, "Package 3" is an application package including four applications (respectively illustrated as "App. 3.1" to "App 3.4" in FIG. 4A) and is selected by the user. Thus, the information associated with "package 3" is presented in a distinguishing manner (e.g., filled with a pattern) from other application packages, and the detail information of the four applications included in "Package 3" are presented in sub-window 410.

The order of the application packages illustrated in sub-window 410 may be pre-populated by the infotainment system based on a historical record. For instance, the processor (e.g., processor 210) of the infotainment system may obtain record file (including historical information of user-designated installation order, etc.) from a storage (e.g., storage 130, storage 220, etc.) and automatically arrange the order of the application packages according to the record file when generating the GUI. Alternatively, the order of the application packages illustrated in sub-window 410 may be pre-populated by the infotainment system based on the timestamp associated with each of the application packages. For instance, the processor may record the time instant whenever an application package is detected (e.g., the time when information of the application package is received, etc.) and automatically arrange the order of the application packages according to the recorded time instant of each application package (e.g., application package which is detected most recently will be assigned with lower order and be presented first, etc.).

If the user is satisfied or agreeable with the pre-populated order, the user may simply initiate the installation process by interacting (e.g., tapping, etc.) with interactive element 430. Accordingly, the infotainment system (or one or more components included therein) may download and/or install the application packages according to the pre-populated order.

Otherwise, the user may select or configure the order of downloading and/or installing the application packages by interacting with the interactive elements 420. The user may select or configure the order of the application packages in a bundle or in discrete (when applicable). For instance, if the user would like to change the order of a first application package to an order lower than a second application package, the user may click or tap on the up arrow of the associated interactive element 420. Further, the user may rearrange the order of applications included in an application package in a similar manner. Accordingly, the processor of the infotainment system may update the GUI to present the application packages in the user-designated order.

FIG. 4B illustrates another example generalized GUI 450, according to one or more embodiments. The GUI 450 may be an updated version of GUI 400 of FIG. 4A, in which the user has moved or reconfigured the order of application packages "App. 1" and "App. 2", and as well as the order of applications "App. 3.1" and "App. 3.2" included in application package "Package 3".

For instance, the user may interact with the down arrow of element 420 of "App. 1" in GUI 400 (or may interact with the up arrow of element 420 of "App. 2" in GUI 400) to rearrange the order of application package "App. 1" and all application(s) bundled to application package "App. 1", and may interact with the down arrow of element 420 of "App. 3.1" in GUI 400 (or may interact with the up arrow of element 420 of "App. 3.2" in GUI 400) to rearrange the order of application to discretely arrange the order of applications included in application package "Package 3".

Subsequently, the user may initiate the installation process by interacting (e.g., tapping, etc.) with interactive element 430. Accordingly, the infotainment system (or one or more components included therein) may download and/or install the application packages according to the reconfigured and user-designated order.

It can be understood that example embodiments of the present disclosure may also allow the user to configure or select the order for downloading and/or installing the application packages in any other suitable manner, without departing from the scope of present disclosure. For instance, instead of interacting with interactive element 420, the user may rearrange the order of application packages by dragging and dropping the application packages to the desired position. Alternatively, the user may also configure or select said order in a pop-out panel or sub-window (e.g., triggered by the user via double pressing GUI 400 or GUI 450, etc.), as described below with reference to FIG. 5.

FIG. 5 illustrates an example GUI including a sub-window 500, according to one or more embodiments. Sub-window 500 may be a floating panel overlaying GUI 400 in FIG. 4A, and may be generated by infotainment system (or one or more components included therein) in response to a trigger or event (e.g., a specific user interaction, etc.).

Referring to FIG. 5, sub-window 500 may include a plurality of interactive elements 510 each of which associated with a respective application package, a drop-down list 511 associated with the plurality of interactive elements 510, and an interactive element 520.

Each of the interactive elements 510 may be an interactive icon presenting the current order associated with the respective application package (e.g., interactive icon associated with "App. 1" presenting order of "1", etc.). For instance, when interactive element 510 is being interacted by a user, an associated drop-down list 511 may be presented to allow the user to select an intended order therefrom (as illustrated in FIG. 5). The selectable option included in the drop-down list 511 may be computed by the infotainment system, such that when an order is selected for an application package, the interactive icons of other application packages may be updated. For instance, if a user has selected "2" in drop-down list 511 of "App. 1", the interactive icon of "App. 2" may be updated from "2" to "1", and the like.

Accordingly, the user may interact with interactive element 520 to set the selected order. Subsequently, the infotainment system may close sub-window 500 and generate a GUI (e.g., an updated version of GUI 400) presenting the application packages according to the user-designated order. Later, the user may initiate the installation process by interacting with interactive element as described above with reference to FIG. 4A-FIG. 4B.

In view of the above, example embodiments of the present disclosure enable a user to specify the order for downloading and/or installing application packages. According to one or more embodiments, in addition to user-designated order, the infotainment system may also determine the order for downloading and/or installing application packages based on criticality or urgency of the application packages. For instance, the infotainment system may determine the criticality or urgency of an application package based on the type of the application packet and/or the type of user who is requesting for installing the application package, may compute a score value defining the determined criticality or urgency for each application package, and may automatically download and/or install the application packages according to an order defined by the score value.

FIG. 6 illustrates a table containing examples application packages and the associated information, according to one or more embodiments.

Referring to FIG. 6, the table may include information associated with users (referred to as "user information" hereinafter) who have configured or selected one or more application packages for installing in the vehicle, and information associated with the application packages such as application name, application type, and installation order requested or designated by the user for installing the particular application package. The user information may contain an identifier (ID) of the user and a user type. The ID and user type may be detected by the infotainment system whenever the user is accessing the infotainment system.

For instance, a vehicle owner may register (e.g., by inputting his information to the infotainment system) his device (e.g., a user equipment (UE), etc.) to infotainment system and the infotainment system may assign an ID and an associated user type to the vehicle owner, such that the infotainment system may differentiate the vehicle owner from other users (e.g., guest passenger, deliverer user, etc.) whenever the infotainment system detects that the device of the vehicle owner is accessing the infotainment system. Similarly, a deliverer user (e.g., vehicle manufacturer, software developer, etc.) may be registered to the infotainment system during vehicle maintenance, software update, and the like, such that the infotainment system may assign an ID and associated user type to the deliverer user to differentiate the deliverer user from other users (e.g., vehicle owner, guest passenger, etc.). On the other hand, the infotainment system may determine that an access from unregistered device (e.g., within a range of distance from the vehicle, etc.) or an access directly from the display device installed in the vehicle is an access from a guest passenger, and may assign a temporary ID and an associated user type to the user. According to an embodiment, the infotainment system may generate and display a temporary passcode on the display device in the vehicle and/or the device of the vehicle owner, and may request the guest passenger to input the temporary passcode in order to access and utilize the infotainment system.

According to embodiments, whenever an installation of an application package is requested, the infotainment system may determine the type of user associated with the installation request and may configure the priority of the installation according to the user type. For instance, assuming that three users with different user types, e.g., a vehicle owner, a guest passenger, and a deliverer user, have requested for application packages installation at the same time, the infotainment system may prioritize the installation request from the deliverer user, following by the installation request from the vehicle owner, and lastly the installation request from the guest passenger.

According to an embodiment, the infotainment system may compute a score value defining the installation priority of application packages. Specifically, the processor of the infotainment system may collect information such as but are not limited to: user type, application type, and requested installation order, and may compute the score value based therefrom. By way of example, each of the user types, each of the application types, and/or each of the installation orders may have a corresponding value mapped thereto, and said mapping may be predefined by authorized user (e.g., vehicle manufacturer, vehicle owner, etc.) and may be stored in the storage of infotainment system. Accordingly, upon receiving an installation request from a user(s), the processor of the infotainment system may retrieve the mapping from the storage and may compute the score value based on the collected information and the mapping.

An example use case is exemplified in FIG. 6. In this use case, the infotainment system may receive installation requests from three users (i.e., vehicle owner, guest passenger, deliverer) to install application packages, wherein the vehicle owner has requested to install application packages "App. 1" and "App. 2" (with lower order/higher priority for installation of "App. 1"), the guest passenger has requested to install application package "App. 4" (with the same order selected by vehicle user for installing "App. 1"), and the deliverer has requested to install application package "App. 5".

In this regard, based on determining that the request for installing "App. 5" is from the deliverer and/or based on determining that "App. 5" is a system hotfix (which has higher criticality than other types of application package), the infotainment system may compute or assign a highest score value for the installation request such that downloading and/or installation of "App. 5" may be prioritized over other application packages (even if the deliverer has not selected an installation order).

Further, although installation requests for "App. 1" and "App. 4" has the same requested installation order of "1" and has the same application type, the infotainment system may compute or assign a higher score value for installing "App. 1" as compared to score value for installing "App. 4", based on determining that the request for installing "App. 1" is from the vehicle owner.

On the other hand, although installation request for "App. 2" is from the vehicle owner, the infotainment system may compute or assign a lower score value for installing "App. 2" as compared to score value for installing "App. 4", based on determining that the installation order of "App. 2" is higher than the installation order of "App. 4".

To this end, the infotainment system may download and/or install the application packages according to the order defined by the score values. For instance, in the example use case illustrated in FIG. 6, the infotainment system may download and/or install the application packages according to the following order: "App. 5" first, followed by "App. 1", followed by "App. 4", and lastly "App. 2". According to an embodiment, when a new installation request is received, the infotainment system may automatically update the score values of each of the pending downloading and/or installation, such that the priority associated therewith can always be updated in view of the real-time or near real-time requirement.

In view of the above, example embodiments of the present disclosure enable certain application packages to be prioritized ahead of other applications, according to the associated user type, application type, and/or requested installation order. In this way, the installation order of application packages may be more accurately configured and selected, taking into consideration of criticality and importance of the application packages.

For example, application packages designated as safety-critical or related to a vehicle defect or vehicle testing (hereinafter referred to as predetermined priority applications) may be prioritized ahead of other applications and downloaded and installed first, irrespective of a user's designations. According to an embodiment, a non-delivered user (e.g., the vehicle owner, the guest passenger, etc.) may only be permitted to select the order of applications that are not designated or predetermined as priority applications. To this end, the priority applications may be designated as such by the deliverer.

It can be understood that the information illustrated in the table of FIG. 6 are merely examples for descriptive purposes, and the scope of present disclosure should not be limited thereby. For instance, more or less information may be included in the table, and the information may be presented in a different manner. Further, the infotainment system may always prioritize the installation request based on the specific user type regardless of the requested installation order (e.g., all installation requests from the vehicle owner may be prioritized over installation requests from guest passenger, etc.).

Additionally, in one or more embodiments, the order of download and/or installation may be determined automatically using a user's history or prior behaviors, or related users' histories and behaviors. For example, a machine learning (ML) model may predict a desired order of installation for application packages based on a user's prior history or related users' prior histories (e.g., other users with similar application selections, users with same or similar user profiles, etc.). In some embodiments, the automated determination may be performed for any selected applications for which an order of downloading/installing is not specified. Further, the ML model may include a supervised ML model, an unsupervised ML model, or a combination thereof.

Figure 7:
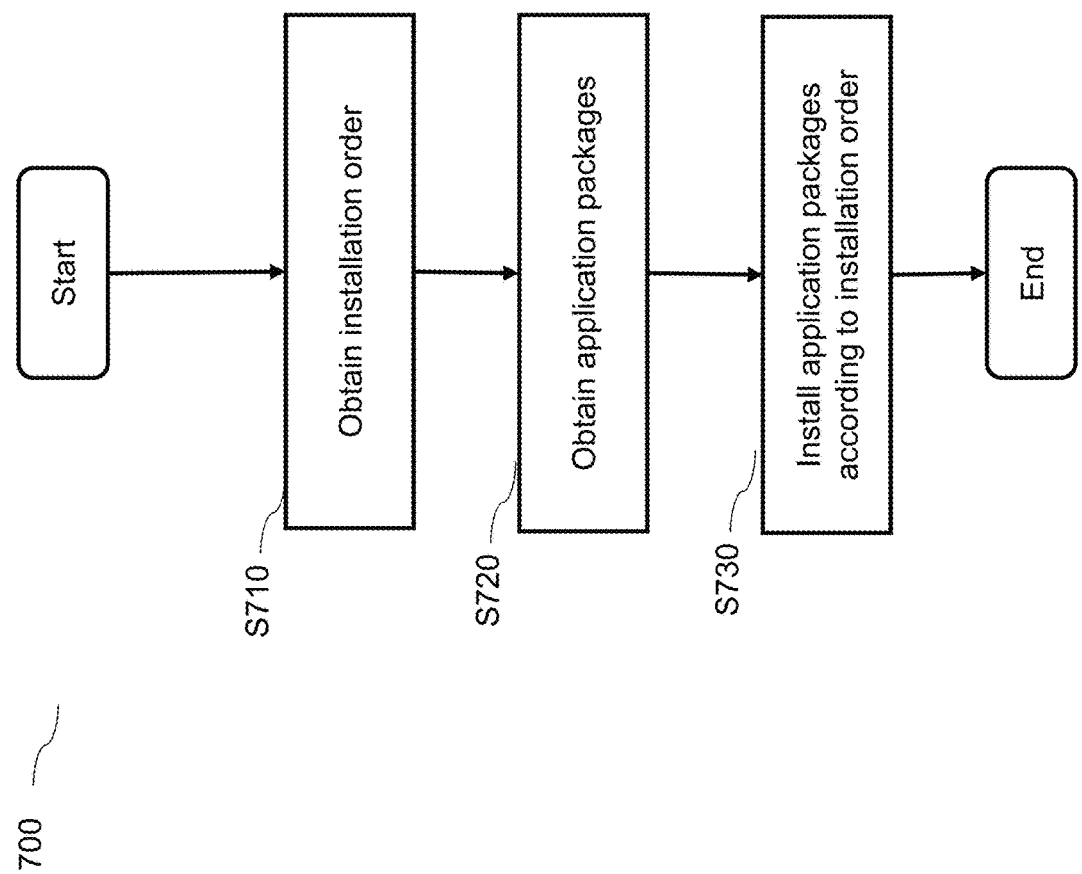
FIG. 7 illustrates a block diagram of a method for installing application packages in accordance with an installation order, according to one or more embodiments.

FIG. 7 illustrates a block diagram of a method 700 for installing application packages in accordance with an installation order, according to one or more embodiments. The installation order may be a user-designated installation order (e.g., determined by a user via operations described above with reference to FIG. 3 to FIG. 5), an installation order determined by the infotainment system (e.g., determined by the infotainment system via operations described above with reference to FIG. 6), and/or an installation order automatically determined by the infotainment system via utilizing a ML model. Method 700 may be performed by an infotainment system (e.g., infotainment system 200 in FIG. 2, etc.). According to embodiments, one or more operations of method 700 may be performed by at least one processor (e.g., processor 210 in FIG. 2) of the infotainment system.

Referring to FIG. 7, at operation S710, an installation order associated with a plurality of application packages is obtained. For instance, the processor of infotainment system may obtain the user-designated installation order from storage of infotainment system. Alternatively, the processor may compute a score value for each of the plurality of application packages (in a similar manner as described above with reference to FIG. 6) and determine an installation order therefrom in real-time or near real-time. Otherwise, the processor may obtain the required information (e.g., historical record, etc.) and input said information into a machine learning (ML) model, and the ML model may automatically determine an installation order therefrom.

At operation S720, the plurality of application packages are obtained. According to an embodiment, the infotainment system may download the plurality of application packages based on the installation order obtained at operation S710. For instance, the infotainment system may retrieve and download application packages with lower installation order (i.e., higher priority) from a storage (e.g., storage 130 in FIG. 1), before retrieving and downloading application packages with higher installation order (i.e., lower priority).

It is contemplated that the above described operations are merely example of an example embodiment, and the scope of present disclosure should not be limited thereto. Specifically, in other embodiments, all application packages may be downloaded in parallel or simultaneously. Alternatively, priority applications (e.g., applications having a specific application type, applications associated with a specific user, etc.) may be downloaded first (and installed) prior to parallel downloading of other application packages. Further, in some embodiments, operation S720 may be performed before operation S710 (i.e., the application packages may be obtained before obtaining the associated installation order.)

After obtaining the installation order and the application packages, at operation S730, the infotainment system may be configured to install the application packages according to the installation order.

For instance, the processor of the infotainment system may determine whether or not the application packages include any priority application package(s), and may prioritize the installation of the priority application package(s), if any. According to an embodiment, the processor of the infotainment system may determine whether or not an application package is a priority application package based on determining whether or not the application package belongs to a specific type of application package (e.g., a safety-critical application package, an application package related to a vehicle defect, etc.). Alternatively, the processor of the infotainment system may determine whether or not an application package is a priority application package based on determining whether or not the application package is associated with a specific user (e.g., an application package associated with a deliverer, etc.). It is contemplated that the processor of the infotainment system may also determine whether or not an application package is a priority application package based on the type of application package, the type of associated user, and/or any other suitable information.

Figure 8:
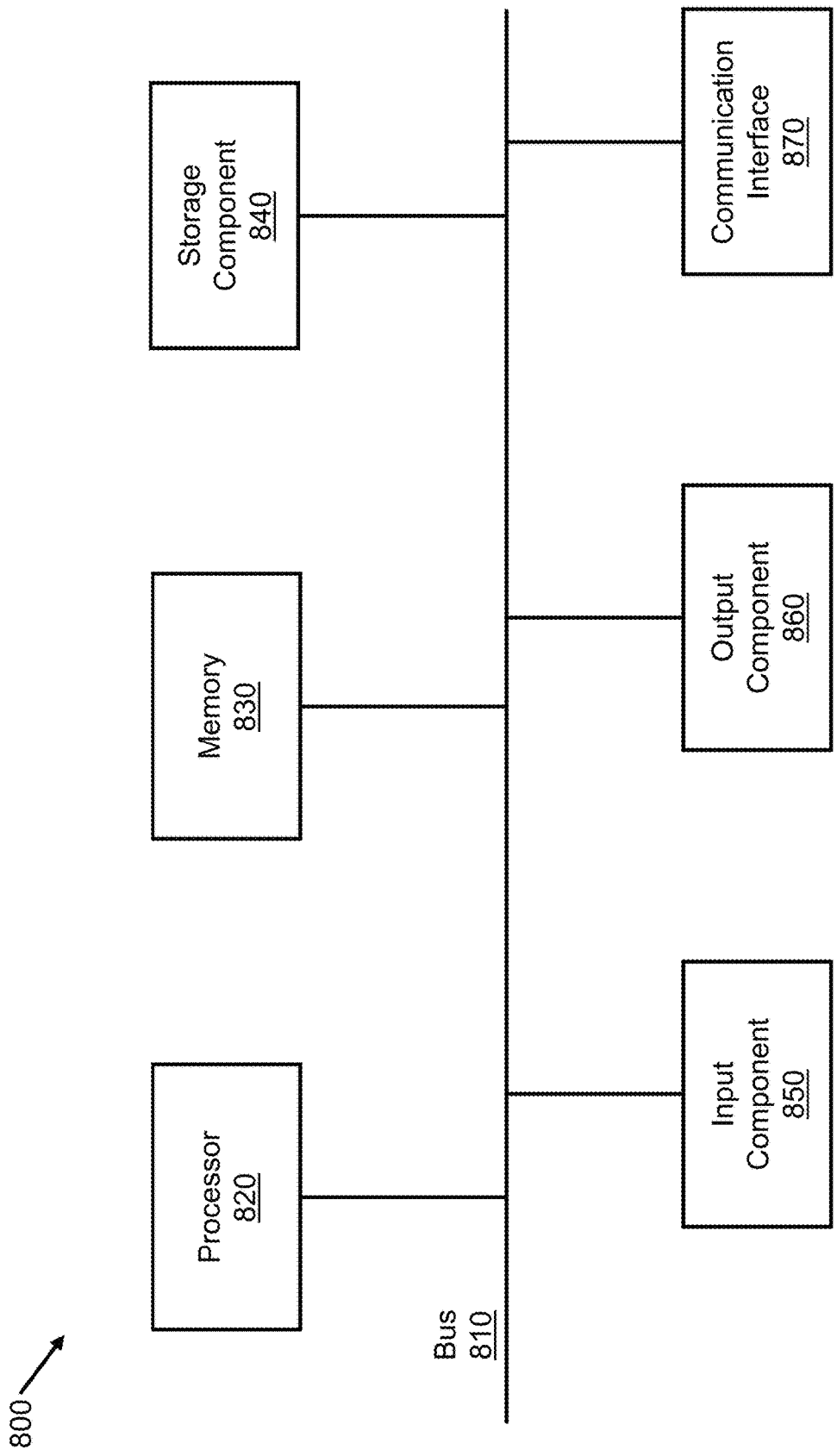
FIG. 8 illustrates a diagram of example components of a device, according to one or more embodiments.

FIG. 8 illustrates a diagram of example components of a device 800, according to one or more embodiments. Device 800 may correspond to UE 140 in FIG. 1. As shown in FIG. 8, device 800 may include a bus 810, a processor 820, a memory 830, a storage component 840, an input component 850, an output component 860, and a communication interface 870. In embodiments, any one of the operations or processes of FIG. 1 through FIG. 7 may be implemented by or using any one of the elements illustrated in FIG. 8.

Bus 810 includes a component that permits communication among the components of device 800. Processor 820 may be implemented in hardware, firmware, or a combination of hardware and software. Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

Device 800 may perform one or more processes described herein. Device 800 may perform these processes in response to processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer-readable medium at any possible technical detail level of integration. Further, one or more of the above components described above may be implemented as instructions stored on a computer readable medium and executable by at least one processor (and/or may include at least one processor). The computer-readable medium may include a computer-readable non-transitory storage medium (or media) having computer-readable program instructions thereon for causing a processor to carry out operations.

The computer readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming languages such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for specifying an installation order for application packages in a vehicle, the method comprising:
    downloading, by at least one processor of the vehicle, a plurality of application packages;
    obtaining, by the at least one processor, a user-designated installation order for the plurality of application packages; and
    installing the plurality of application packages based on the obtained user-designated installation order,
    wherein the installing comprises:
    determining an application package among the plurality of application packages as a priority application package, and
    installing the determined priority application package first, irrespective of the user-designated installation order.

2. The method according to claim 1, wherein the determining comprises determining a safety-critical application package or an application package related to a vehicle defect as the priority application package.

3. The method according to claim 1, wherein the downloading comprises downloading the plurality of packages in accordance with the user-designated installation order.

4. The method according to claim 1, further comprising, for one or more applications in which an installation order is not designated by a user, determining an installation order based on at least one of a user's behavior history or related users' behavior histories.

5. The method according to claim 4, wherein the determining the installation order comprises determining the installation order using a machine learning model.

6. The method according to claim 1, wherein the obtaining of the user-designated installation order for the plurality of application packages comprises:
presenting information associated with the plurality of application packages to the user;
receiving user input associated with the plurality of application packages; and
determining, based on the user input, the user-designated installation order for the plurality of application packages.

7. A system for specifying an installation order for application packages in a vehicle, the system comprising:
at least one memory storage storing computer-executable instructions; and
at least one processor communicatively coupled to the at least one memory storage, wherein the at least one processor is configured to execute the computer-executable instructions to:
download a plurality of application packages;
obtain a user-designated installation order for the plurality of application packages; and
install the plurality of application packages based on the obtained user-designated installation order, and
wherein the at least one processor is configured to execute the computer-executable instructions to install the plurality of application packages by:
determining an application package among the plurality of application packages as a priority application package, and
installing the determined priority application package first, irrespective of the user-designated installation order.

8. The system according to claim 7, wherein the at least one processor is configured to execute the computer-executable instructions to determine the application package as the priority application package by:
determining a safety-critical application package or an application package related to a vehicle defect as the priority application package.

9. The system according to claim 7, wherein the at least one processor is configured to execute the computer-executable instructions to download the plurality of application packages by downloading the plurality of packages in accordance with the user-designated installation order.

10. The system according to claim 7, wherein the at least one processor is further configured to execute the computer-executable instructions to:
for one or more applications in which an installation order is not designated by a user, determine an installation order based on at least one of a user's behavior history or related users' behavior histories.

11. The system according to claim 10, wherein the at least one processor is further configured to execute the computer-executable instructions to determine the installation order by determining the installation order using a machine learning model.

12. The system according to claim 7, wherein the at least one processor is further configured to execute the computer-executable instructions to obtain the user-designated installation order by:
presenting information associated with the plurality of application packages to the user;
receiving user input associated with the plurality of application packages; and
determining, based on the user input, the user-designated installation order for the plurality of application packages.

13. A non-transitory computer-readable recording medium having recorded thereon instructions executable by at least one processor to cause the at least one processor to perform a method for specifying an installation order for application packages in a vehicle, the method comprising:
downloading, by at least one processor of the vehicle, a plurality of application packages;
obtaining, by the at least one processor, a user-designated installation order for the plurality of application packages; and
installing the plurality of application packages based on the obtained user-designated installation order,
wherein the installing comprises:
determining an application package among the plurality of application packages as a priority application package; and
installing the determined priority application package first, irrespective of the user-designated installation order.

14. The non-transitory computer-readable recording medium according to claim 13, wherein the determining comprises determining a safety-critical application package or an application package related to a vehicle defect as the priority application package.

15. The non-transitory computer-readable recording medium according to claim 13, wherein the downloading comprises downloading the plurality of packages in accordance with the user-designated installation order.

16. The non-transitory computer-readable recording medium according to claim 13, wherein the method further comprising:
for one or more applications in which an installation order is not designated by a user, determining an installation order based on at least one of a user's behavior history or related users' behavior histories.

17. The non-transitory computer-readable recording medium according to claim 16, wherein the determining the installation order comprises determining the installation order using a machine learning model.

* * * * *